United States Patent [19]
Higuchi

[11] Patent Number: 5,668,704
[45] Date of Patent: Sep. 16, 1997

[54] SELF-EXCITING FLYBACK CONVERTER

[75] Inventor: Yoshio Higuchi, Daito, Japan

[73] Assignee: Funai Electric Co., Ltd., Osaka, Japan

[21] Appl. No.: 512,922

[22] Filed: Aug. 9, 1995

[30] Foreign Application Priority Data

Aug. 9, 1994 [JP] Japan ................................ 6-187117

[51] Int. Cl.[6] .................. H02M 3/335; H02M 7/122; H02M 3/24
[52] U.S. Cl. .................. 363/19; 363/56; 363/95
[58] Field of Search .................. 363/20, 21, 50, 363/51, 95, 56, 19

[56] References Cited

U.S. PATENT DOCUMENTS

| | | | |
|---|---|---|---|
| 4,079,444 | 3/1978 | Kuhn | 363/56 |
| 4,156,273 | 5/1979 | Sato | 363/56 |
| 4,432,032 | 2/1984 | Baker et al. | 361/111 |
| 4,439,806 | 3/1984 | Braijder | 361/98 |
| 4,577,268 | 3/1986 | Easter et al. | 363/21 |
| 4,918,564 | 4/1990 | Walker et al. | 361/94 |
| 4,956,761 | 9/1990 | Higashi | 363/19 |
| 5,392,206 | 2/1995 | Peterson et al. | 363/19 |

*Primary Examiner*—Peter S. Wong
*Assistant Examiner*—Bao Q. Vu
*Attorney, Agent, or Firm*—Bacon & Thomas

[57] ABSTRACT

A self-exciting flyback converter adapted to stabilize an output voltage to be outputted to an external device by controlling the maximum value of a switching current of a switching transistor with a current flowing through a control transistor, the switching transistor switching a current of a primary coil, and the control transistor being a transistor to which an output of a photocoupler which indicates an error in the output voltage is applied. The self-executing flyback converter also has a protective circuit that is designed to bring the switching current of the switching transistor to zero by increasing the current flowing through the control transistor when the output of the photocoupler indicates a drop in the output voltage due to an overload.

6 Claims, 3 Drawing Sheets

SELF-EXCITING FLYBACK CONVERTER

BACKGROUND OF THE INVENTION

1. Field of the Invention

The invention relates to a self-exciting flyback converter that stabilizes the output voltage thereof by feeding back the output voltage through a photocoupler. The invention is directed, in more particular, to a self-exciting flyback converter that stops the switching operation when the output voltage thereof is decreased by an overload.

2. Description of the Related Art

Switching regulators that supply a stable DC voltage using as the input thereto a DC voltage obtained by rectifying the commercial AC power supply come in two types: a separately excited forward converter and a self-exciting flyback converter. The separately excited forward converter stabilizes the output voltage by pulse width modulation (PWM) control, while the self-exciting flyback converter is a switching regulator based on RCC. As a protective circuit for preventing breakage caused by an overload, conventional techniques are available for the both types of converters. The conventional exemplary protective circuits will be described below.

In the separately excited forward converter, the output voltage of an error amplifier fluctuates when the output voltage drops due to some abnormality such as an overload or a short-circuit. Thus, an excess in the output voltage of the error amplifier from a predetermined range gives an indication that there is some abnormality. Once such an indication has been given, it is judged whether the abnormality continues to stay for a predetermined short period. That is, an instantaneous level change due to effects such as noise is distinguished from the occurrence of abnormality through this judgment. When abnormality continues to be present for a predetermined period of time, the converter turns off the switching element while judging that there is some abnormality such as an overload or a short-circuit, so that the supply of the DC voltage is stopped (Conventional Example 1).

On the other hand, in the self-exciting flyback converter, a system in which the maximum current flowing through the switching transistor is limited based on a voltage obtained by adding a negative voltage to a positive voltage, the negative voltage being generated in the base coil when the switching transistor is in the off state and the positive voltage indicating the emitter current of the switching transistor. That is, since the negative voltage decreases when some abnormality such as an overload or a short-circuit occurs, the total voltage increases. Therefore, to reduce the total voltage, the emitter current of the switching transistor is controlled so as to decrease, thereby causing the output voltage to decrease. As a result, the current to be outputted can be limited to a predetermined value.

This design has the shortcoming that the current to be limited changes as the input voltage changes. To overcome this shortcoming, a design in which the maximum current flowing through the switching transistor is limited by the voltage obtained by adding up three voltages has been proposed. The three voltages are: a positive voltage generated in the base coil when the switching transistor is in the on state; a negative voltage generated in the base coil when the switching transistor is in the off state; and a positive voltage indicating the emitter current of the switching transistor. This design is advantageous in that the output current at the time of abnormality can be limited to a substantially constant value by the effect of the positive voltage generated in the base coil when the switching transistor is in the on state even if the input voltage changes.

In addition, this design characterized as adding up the three voltages is also advantageous in that the output current to be limited can be folded back in accordance with the setting of a ratio of addition. The foldback design is advantageous in that the output current at the time of abnormality can be limited to a small value (Conventional Example 2).

However, even in the case of employing Conventional Example 2, the current limited by the foldback design causes abnormal heating at an element suffering from a short-circuit or the like. For this reason, the following problem is encountered if the self-exciting flyback converter is used for, e.g., a domestic television set.

That is, when some abnormality occurs in the television set, there is a case where nobody is present around the television set and where such an abnormal television set is left unattended for a long period of time. This means that abnormal heating of the element persists for a long time, thereby imposing the problem that the breakage of the element affects other parts that are normally functioning.

On the other hand, there is no likelihood that the element will be broken in the case of employing Conventional Example 1 since the switching operation is immediately stopped at the time of abnormality in this case. However, when a comparison is made between the separately excited forward converter and the self-exciting flyback converter, the separately excited forward converter has a more complicated circuit configuration than that of the self-exciting flyback converter even excluding the protective circuit, and this makes the separately excited forward converter expensive in addition to the aforementioned disadvantage of complicated structure.

SUMMARY OF THE INVENTION

The invention has been made to overcome the aforementioned problems. The object of the invention is, therefore, to provide a self-exciting flyback converter capable of stopping the switching operation at the time of an overload by bringing the switching current of the switching transistor to zero when the photocoupler output indicates a drop in the output voltage due to the overload.

To achieve the above object, the invention provides a self-exciting flyback converter including: a photocoupler whose output indicates an error in an output voltage to be outputted to an external device; a switching transistor for switching a current of a primary coil of a transformer; a control transistor, to which the output of the photocoupler is applied, for controlling a maximum value of a switching current of the switching transistor so as to stabilize the output voltage; and a protective circuit for bringing the switching current of the switching transistor to zero by increasing a current flowing through the control transistor when the output of the photocoupler indicates a drop in the output voltage due to an overload.

DETAILED DESCRIPTION OF THE PREFERRED EMBODIMENT

An embodiment of the invention will now be described with reference to the drawings.

Figure 1:
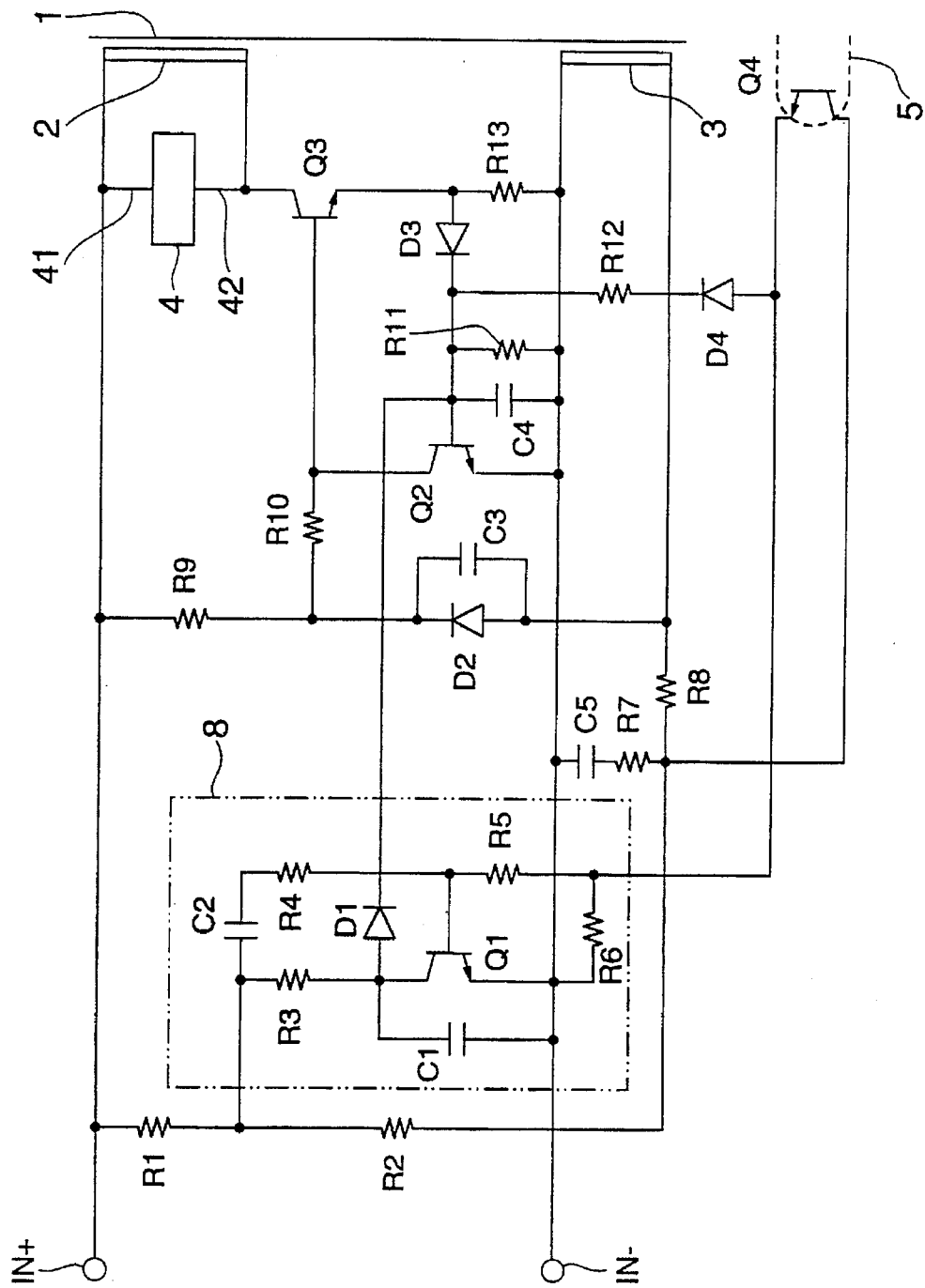
FIG. 1 is a circuit diagram showing the electric connection of primary blocks in a self-exciting flyback converter, which is an embodiment of the invention.

FIG. 1 is a circuit diagram showing the electric connection of a self-exciting flyback converter, which is the embodiment of the invention.

While it is possible to use field effect transistors (FETs) as a protective transistor, a control transistor, and a switching transistor, bipolar transistors are used as a protective transistor Q1, a control transistor Q2, and a switching transistor Q3 in this embodiment. Therefore, the bases of the protective transistor Q1 and the control transistor Q2 function as the input terminals, and the collector of the protective transistor Q1 functions as the output terminal. In the following description, a base denotes an input terminal, and a collector denotes an output terminal.

A plus terminal IN+ and a minus terminal IN− are the input terminals of a DC power supply. That is, a DC current obtained by rectifying and smoothing the commercial power supply is supplied to these terminals.

The switching transistor Q3 switches the current flowing through a primary coil 2 of a transformer 1. For the switching operation, one terminal of the primary coil 2 is connected to the plus terminal IN+ and the other terminal thereof is connected to the collector of the switching transistor Q3. The emitter of the switching transistor Q3 is connected to the minus terminal IN− through a resistor R13 that detects the emitter current as a voltage. A resistor R9, one terminal of which is connected to the plus terminal IN+, supplies an actuating current to the switching transistor Q3. For such an operation, the other terminal of the resistor R9 is connected to the base of the switching transistor Q3 through a resistor R10 that limits the base current.

It may be noted that a block 4 that is connected in parallel with the primary coil 2 is a surge absorbing circuit. The surge absorbing circuit 4 absorbs a surge voltage generated at the primary coil 2 when the switching transistor Q3 turns off. Details of the surge absorbing circuit 4 will be described later.

A photocoupler 5 feeds back an output voltage error to the primary side as an output current. When the output voltage error increases in the positive side, the photocoupler 5 increases the output current. The control transistor Q2 stabilizes the output voltage by controlling the maximum value of the switching current of the switching transistor Q3. For such a control, the emitter of a transistor Q4 is connected to the base of the control transistor Q2 through a diode D4 and a resistor R12. Further, the base of the switching transistor Q3 is connected to the collector of the control transistor Q2. Still further, the base of the control transistor Q2 is connected to the minus terminal IN− through a noise absorbing capacitor C4 and a discharge resistor R11. The emitter of the control transistor Q2 is also connected to the minus terminal IN−.

The voltage detected by the resistor R13 is applied to the base of the control transistor Q2 through a diode D3 so that the switching current flowing through the switching transistor Q3 at the time the power has been turned on is limited.

A base coil 3, one terminal of which is connected to the minus terminal IN−, is an auxiliary coil for self-exciting the switching transistor Q3. For the self-excitation of the switching transistor Q3, the other terminal of the base coil 3 is connected to the base of the switching transistor Q3 through a diode D2 and the resistor R10. It may be noted that a capacitor C3 connected in parallel with the diode D2 is a speed-up capacitor designed to turn off the switching transistor Q3.

The other terminal of the base coil 3 is connected to the plus terminal IN+ through a voltage dividing circuit consisting of a resistor R8, a resistor R2, and a resistor R1. A node between the resistor R8 and the resistor R2 is also connected to the minus terminal IN− through a resistor R7 and a capacitor C5. Further, a node between the resistor R8 and the resistor R2 is connected to the collector of the transistor Q4.

Figure 2:
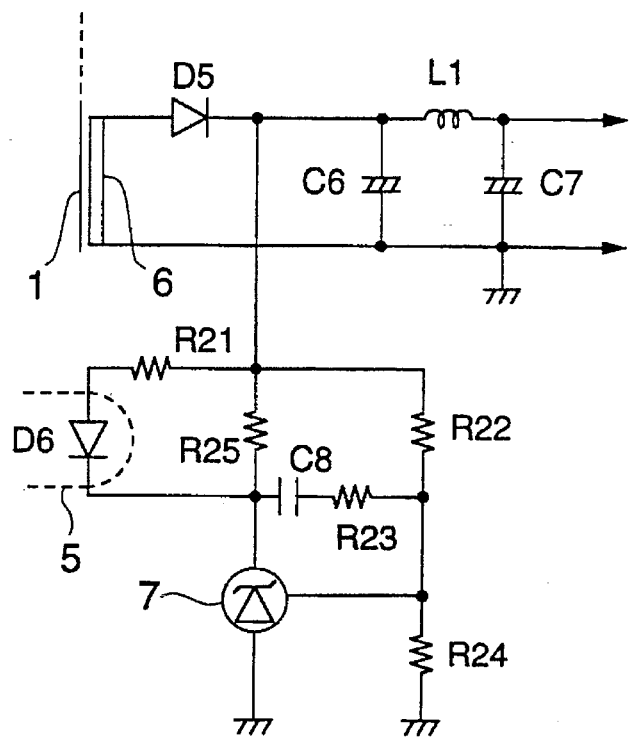
FIG. 2 is a circuit diagram showing the electric connection of an error detecting circuit in the embodiment.

FIG. 2 shows the electric connection of an output voltage error detecting circuit in the embodiment. While a plurality of secondary coils 6, . . . are wound at the transformer 1, only the secondary coil 6 that generates an output voltage to be fed back is shown in FIG. 2.

The voltage generated at the secondary coil 6 is applied to an external device as a stabilized DC power supply through a π-type smoothing circuit consisting of a coil L1 and capacitors C6 and C7 after having been rectified by a diode D5.

The voltage rectified by the diode D5 is divided by a voltage dividing circuit consisting of resistors R22 and R24, and the divided voltage is applied to the comparison input terminal of a shut regulator 7 whose ground terminal is grounded. The voltage rectified by the diode D5 is also applied to the output terminal of the shunt regulator 7 through a resistor R25. A series circuit consisting of a light-emitting diode D6 and a resistor R21 is connected in parallel with the resistor R25.

It may be noted that a series circuit consisting of a capacitor C8 and a resistor R23 constitutes a phase compensating circuit for stabilizing the control.

Figure 3:
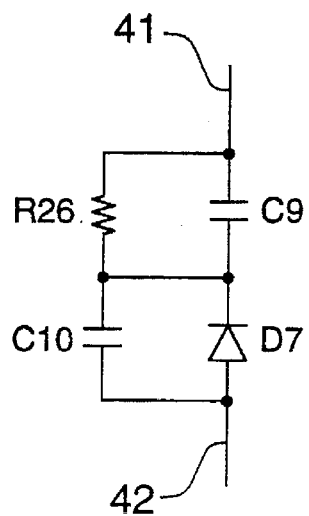
FIG. 3 is a circuit diagram showing the electric connection of a surge absorbing circuit in the embodiment.

FIG. 3 is a circuit diagram showing the electric connection of the surge absorbing circuit 4. One terminal 41 of a capacitor C9 is connected to the plus terminal IN+ and the other terminal thereof is connected to the cathode of a diode D7. The anode (designated by reference numeral 42) of the diode D7 is connected to the collector of the switching transistor Q3. A resistor R26 is connected in parallel with the capacitor C9, while a capacitor 10 is connected in parallel with the diode D7.

The configuration shown in FIGS. 1 to 3 (excluding a protective circuit 8) is, in detail, a conventionally known self-exciting flyback converter circuit.

The protective circuit 8 forms a block that brings the switching current of the switching transistor Q3 to zero by increasing the collector current flowing through the control transistor Q2 when the output of the photocoupler 5 indicates an output voltage drop due to an overload.

For such an operation, the protective circuit 8 has the protective transistor Q1. The emitter of the transistor Q4 (the output of the photocoupler 5) is connected to the base of the protective transistor Q1 through a resistor R5. A load resistor R3 is interposed between a node and the collector of the protective transistor Q1, the node being between the resistors R1 and R2 for generating a divided voltage serving as a DC power supply voltage. A delay capacitor C1 is interposed between the collector of the protective transistor Q1 and the minus terminal IN−, the delay capacitor C1 serving to delay a voltage change at the collector of the protective transistor Q1. Further, a diode D1 is arranged to isolate the emitter of transistor Q1 from the emitter current of transistor Q3, the anode thereof being connected to the collector of the protective transistor Q1 and the cathode thereof being connected to the base of the control transistor Q2.

It may be noted that a series circuit consisting of a capacitor C2 and a resistor R4 constitutes an actuating circuit for turning on the protective transistor Q1 only when the power is turned on. A resistor R6 prevents the emitter of the transistor Q4 from being open when the collector voltage of the transistor Q4 becomes negative, i.e., the resistor R6 functions as an element for reducing the influence due to noise.

The operation of the thus configured embodiment will be described. To simplify the description, the voltage at the node between the resistors R1 and R2 is assumed to remain unchanged.

When the protective circuit 8 is inoperative since the protective transistor Q1 is in the on state, the operation of the embodiment is the same as that of the conventional example.

That is, when the power has been turned on, the base current is supplied to the protective transistor Q1 through the capacitor C2 and the resistor R4 to turn on the protective transistor Q1. On the other hand, the base current is supplied to the switching transistor Q3 through the resistors R9 and R10 to cause the switching current to flow therethrough. The flowing of the switching current causes a voltage to be generated at the base coil 3, which in turn increases the base current of the switching transistor Q3 through the diode D2.

Since the output voltage has not yet been generated at this instance, the emitter current of the transistor Q4 is equal to zero. It is for this reason that the voltage generated at the base coil 3 causes the base current of the switching transistor Q3 to increase to a large extent. However, the control transistor Q2 controls the base current of the switching transistor Q3 in accordance with the voltage generated at the resistor R13. Such a control allows the collector current of the switching transistor Q3 (switching current) to be controlled to a limited value.

When the switching current stops increasing, the polarity of the voltage generated at the base coil 3 inverts, thereby causing the switching transistor Q3 to turn off. During the period in which the switching transistor Q3 is in the off state, energy stored at the transformer 1 generates a voltage at the secondary coil 6 to thereby increase the output voltage. When the energy stored at the transformer 1 has run out, the switching transistor Q3 turns on again so that the transformer 1 starts storing energy.

The output voltage is increased by the similar operation being repeated. While the output voltage is being increased, the maximum value of the switching current flowing the switching transistor Q3 is limited in accordance with the current outputted from the emitter of the transistor Q4. As a result, the output voltage is stabilized through such a control that the voltage divided by the resistors R22 and R24 coincides with the internal reference voltage (e.g., 2.5 V) of the shunt regulator 7.

Further, under the stable state, the emitter current of the transistor Q4 is supplied to the base of the protective transistor Q1, thereby turning on the protective transistor Q1. Thus, the series circuit consisting of the capacitor C2 and the resistor R4 is set to such a value as to allow the protective transistor Q1 to keep turned on for a period (a predetermined period after the power has been turned on) in which no emitter current is supplied from the transistor Q4.

Figure 4:
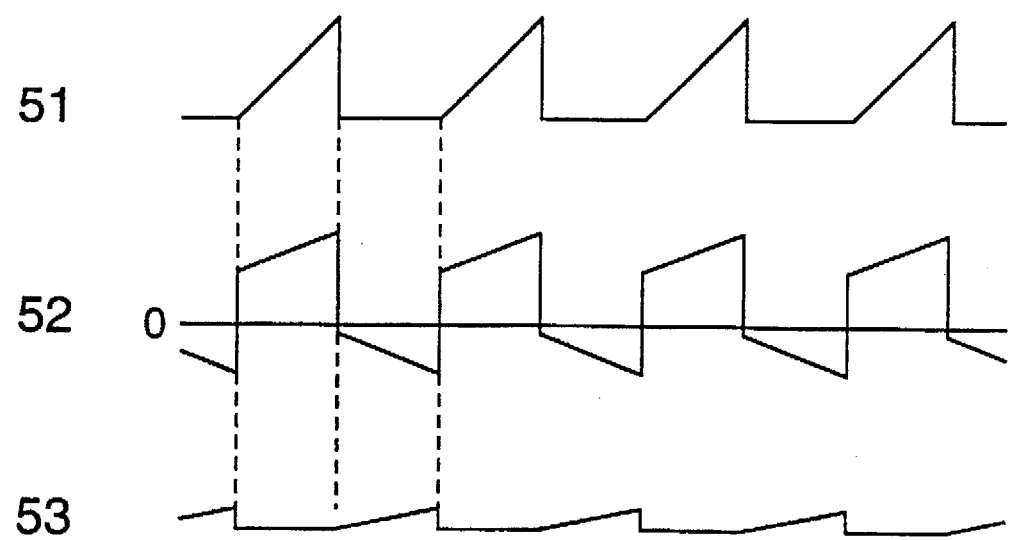
FIG. 4 is a diagram explaining the waveforms of major signals in the embodiment.

FIG. 4 shows the waveforms of major signals under the aforementioned stable state. A waveform 51 indicates change in the switching current of the switching transistor Q3, and a waveform 52 indicates change in the voltage applied to the collector of the transistor Q4.

That is, this embodiment is characterized as not allowing the current to flow through the control transistor Q2 during the period in which the switching transistor Q3 is in the off state. As a result, the power consumption at the control transistor Q2 is reduced, preventing the impairment of the converting efficiency at the time the power consumption of a load is very small.

Further, a waveform 53 indicates change in the voltage of the collector of the protective transistor Q1. During the period in which the switching transistor Q3 is in the off state, the emitter current of the transistor Q4 is equal to zero. As a result, the protective transistor Q1 turns off, thereby increasing the collector voltage of the protective transistor Q1. However, the protective transistor Q1 turns on upon turning on of the switching transistor Q3, and the collector voltage of the protective transistor Q1 therefore decreases. The maximum value of the thus changing collector voltage is determined based on the period in which the switching transistor Q3 is in the off state, the value of the load resistor R3, and the value of the delay capacitor C1 in such a manner that the base current does not flow through the control transistor Q2 through the resistor R3 even if the collector voltage takes the maximum value.

When abnormality is found in the load and the output voltage is decreased due to an overload under the aforementioned stable state, the emitter current of the transistor Q4 takes a value close to zero. This causes the protective transistor Q1 that has been turned on to turn off. As a result, the collector voltage of the protective transistor Q1 increases at a speed determined by the value of the load resistor R3 and the value of the delay capacitor C1.

When the collector voltage of the protective transistor Q1 increases, so does the base current of the control transistor Q2, causing the collector current of the control transistor Q2 to increase. As a result, the base current of the switching transistor Q3 is brought to zero, thereby causing the switching current of the switching transistor Q3 to become zero. If the switching transistor Q3 has already been in the off state, such an off state of the switching transistor Q3 is maintained. That is, the switching operation of the switching transistor Q3 is stopped.

When the switching transistor Q3 stops the switching operation thereof, the output voltage drops, causing the current flowing through the load to become zero. Even when the current flowing through the load has become zero, the emitter current of the transistor Q4 is kept zero. Therefore, the stoppage of the operation of the switching transistor Q3 is maintained.

Such a stoppage continues as long as the protective transistor Q1 is in the off state. As a result, until the power is turned on again after the power has been turned off, the output voltage is kept at zero volt, i.e., the output current is kept zero.

As described in the foregoing, the embodiment of the invention is characterized as giving a delay equal to a period determined by the value of the delay capacitor C1 and the load resistor R3 to a collector voltage increase brought about by the protective transistor Q1 turning off. In reducing the power consumption at the control transistor Q2, even if it is so designed that the emitter current of the transistor Q4 is brought to zero when the switching transistor Q3 is in the off state, the control transistor Q2 can be unaffected by such an operation. In addition, even if the protective transistor Q1 is turned on instantaneously by effects due to noise or the like, the collector voltage of the protective transistor Q1 does not increase, providing the advantage of reducing the erroneous operation caused by the noise.

It may be noted that the invention is not limited to the aforementioned embodiment. While the case where bipolar transistors are used for all of the protective transistor Q1, the control transistor Q2, and the switching transistor Q3 has been described, FETs may be used for the transistors Q1 to Q3.

The self-exciting flyback converter according to the invention has the protective circuit that brings the switching current of the switching transistor to zero by increasing the current flowing through the control transistor when the photocoupler output indicates a drop in the output voltage due to an overload. Therefore, when the photocoupler output indicates a drop in the output voltage due to an overload, the switching current of the switching transistor is brought to zero. Moreover, since a loop in which the output voltage becomes zero volt and in which the switching current becomes zero is formed, the switching operation can be stopped at the time of an overload.

What is claimed is:

1. A self-exciting flyback converter comprising:
    a photocoupler whose output indicates an error in an output voltage to be outputted to an external device;
    a switching transistor connected to the primary coil of a transformer for switching a current of said primary coil of said transformer;
    a control transistor connected to said photocoupler and to said switching transistor, to which the output of said photocoupler is applied, for controlling a maximum value of a switching current of said switching transistor so as to stabilize the output voltage; and
    a protective circuit connected to said photocoupler and to said control transistor, for bringing the switching current of said switching transistor to zero by increasing a current flowing through said control transistor when the output of said photocoupler indicates a drop in the output voltage due to an overload.

2. The self-exciting flyback converter according to claim 1, wherein said protective circuit includes a protective transistor having an input terminal to which the output of said photocoupler is applied, a load resistor connected between a DC power supply and an output terminal of said protective transistor, a delay capacitor for giving a delay to a change in a voltage at the output terminal of said protective transistor, and a diode having an anode connected to the output terminal of said protective transistor and a cathode connected to an input terminal of said control transistor.

3. The self-exciting flyback converter according to claim 2, wherein said protective circuit further includes an actuating circuit for turning on said protective transistor only when a power is turned on.

4. The self-exciting flyback converter according to claim 3, wherein said actuating circuit includes a series circuit consisting of a capacitor and a resistor, said series circuit being connected between the DC power supply and the input terminal of said protective transistor.

5. The self-exciting flyback converter according to claim 2, wherein said switching transistor, control transistor and protective transistor are bipolar transistors.

6. The self-exciting flyback converter according to claim 2, wherein said switching transistor, control transistor and protective transistor are field effect transistors.

* * * * *